[54] PROCESS AND APPARATUS FOR MATERIAL EXCAVATION BY BEAM ENERGY

[72] Inventor: Dieter Konig, Hohenwaldeckstr 8, Munich 90, Germany

[22] Filed: Dec. 16, 1970

[21] Appl. No.: 98,892

Related U.S. Application Data

[63] Continuation of Ser. No. 735,635, June 10, 1968.

[30] Foreign Application Priority Data

June 9, 1967 Germany ...................... P 16 21 355.1

[52] U.S. Cl. .................................. 219/121 EM, 219/121 L
[51] Int. Cl. ................................................ B23k 9/00
[58] Field of Search ............ 219/121, 121 EB, 121 EM, 13 F, 219/69

[56] References Cited

UNITED STATES PATENTS

| 3,431,389 | 3/1969 | Tudor et al. | 219/121 |
| 3,192,357 | 6/1965 | Duffey et al. | 219/73 |
| 3,410,979 | 11/1968 | Larsson | 219/68 |

*Primary Examiner*—J. V. Truhe
*Assistant Examiner*—Gale R. Peterson
*Attorney*—Sandoe, Neill, Schottler & Wilkstrom

[57] ABSTRACT

Process and apparatus for extracting material by means of beam energy, including producing depressions, slots, cuts, bores, and other recesses in which additional forces are exerted on the material impacted and heated by the beam energy, characterized by the feature that at least one auxiliary substance is used to exert forces on the heated material to remove the heated material from the processing region.

17 Claims, 16 Drawing Figures

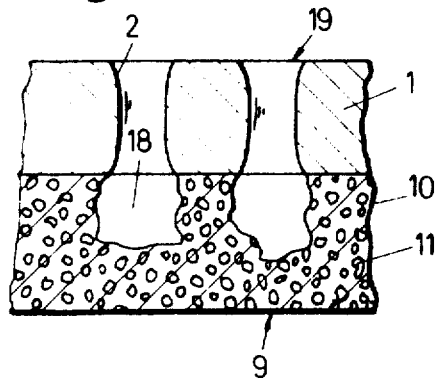
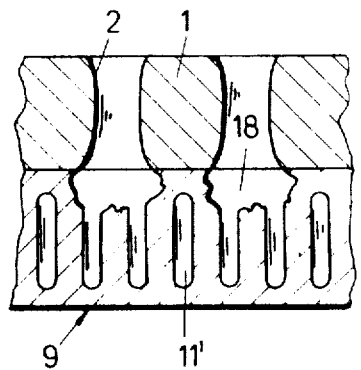
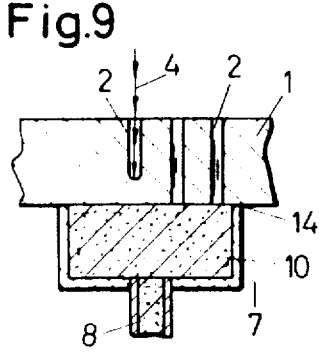
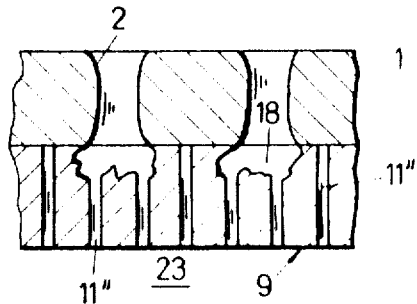
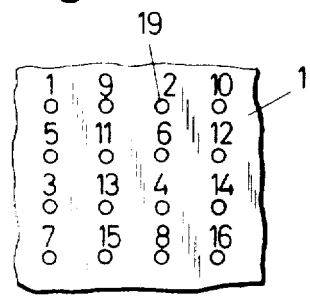
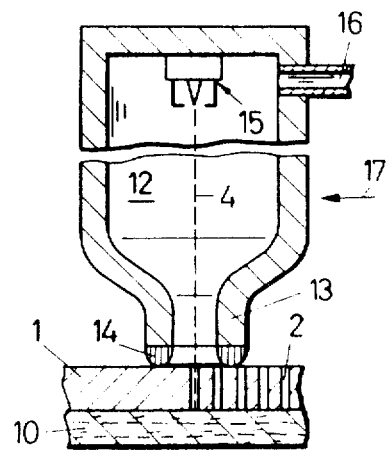

PROCESS AND APPARATUS FOR MATERIAL EXCAVATION BY BEAM ENERGY

This application is a continuation of Ser. No. 735,635, filed June 10, 1968.

The invention concerns a process and apparatus for material excavating by means of beam energy especially the shaping of workpieces including the production of depressions, slots, bores and other recesses, in which additional forces are exerted on the material heated and impacted by beam energy.

In material excavating processes utilizing beam energy, including, for example, cutting, milling or boring with focused electron beams, a difficulty is frequently encountered in that the material melted at the processing point by the energy beam is not removed completely or quickly enough from the processing region. Difficulties of this kind occur more particularly during boring. Though high power densities and thereby very fine holes with short processing times may be obtained with energy beams, it is yet difficult to remove the material melted in the bore hole completely therefrom against the action of capillary forces. Hitherto, the difficulties described were overcome by the selection of the power or power density of the beam energy to be so high that the material to be excavated evaporates at least partially at an as high rate as possible, thereby escaping from the processing region, and forcibly engages any still existing liquid or solid components of the material being processed. Especially in materials having very high boiling points, thus in most metals, this process however has the fundamental disadvantage in that the considerable additional power required for the evaporation is used in the form of the very costly beam energy; this adds to the costs of the beam generating plant or compels an extension of the processing time. Blowing clear processing points, especially bore holes, by evaporated workpiece material is often so irregular as to form irregular edges of condensed material or such which has solidified again.

It has been proposed to exert additional forces on the material to be processed independent of the beam so as to remove the molten or detached material at the processing point from the processing region. Thus, the use of mechanical or mechanically produced additional forces, such as interia forces and electro-magnetically produced additional forces have been proposed. The apparatus required in these proposals require additional space and incur additional costs.

The present invention is based on the solving of the problem of producing additional forces for removing, in a particularly simple manner, the material affected and heated by the beam energy.

To solve this problem the invention provides a process which is characterized by the feature that at least one auxiliary substance us used for exerting forces on the material to move the heated material out of the processing range/region.

In the process in accordance with the invention it is hence only necessary to have present or supply auxiliary substances to the processing point to produce the required forces. No complex or costly apparatus is required for this.

A particularly simple embodiment of the process in accordance with the invention is characterized by the feature that in the processing region at least one auxiliary substance is provided which at the processing temperature develops a high vapor pressure, so that the material loosened, melted or evaporated at the processing point is blown out of the processing region. It is expedient to use an auxiliary substance which at processing temperature develops an as large as possible quantity of gas, so that the material portion loosened (melted or evaporated) at the processing point by the heating are blown out of the processing region.

It has been found that in the selection of an auxiliary substance one is not limited to substances which have a relatively high absorption property for the beam energy used but that, with materials having a relatively low rate of absorption, sufficient gas or vapor pressure can be produced to forcibly eject the molten workpiece material. This phenomenon is probably to be attributed to the fact that when using auxiliary substances or low absorbing ability the direct heat transfer from the regions of the workpiece material heated during processing ensures an adequate energy supply to the auxiliary substance.

In many cases a metal may be used with advantage as auxiliary substance which has a higher vapor pressure at the same temperature compared with the material to be processed; for example, when processing steel, metals such as zinc or brass may be used. It may, however, also be expedient to use a material as auxiliary substance which on heating reacts substantially completely into substances which at normal temperature are gaseous. According to the invention, for example, halogenated polyethylenes, for example polytetrafluorethylene, may be used as auxiliary substances and such substances evaporate without trace.

In accordance with the invention it may further be expedient for the auxiliary substance to have at least two components which separately or together exert forces on the heated material. A first component, for example, may be so selected that it very rapidly develops a high vapor pressure and a second component may be so selected that it develops a very large quantity of gas, but having a somewhat lower speed, so that the first component predominantly causes the dissolution of the material to be excavated while the second component then ensures the removal without trace of this material. As component of the auxiliary substances may be used in accordance with the invention, which, subject to the influence of the processing beam energy and/or the processing temperature, react with one another and thus form at least one reaction product which with temperatures prevailing outside the processing region, has a vapor pressure which is lower than the pressure prevailing there in the absence of the reaction product. This method of operation is expedient particularly when the process has to be carried out in a vacuum, for example when using an electron beam as processing beam energy. As first component for example magnesium, and as second component oxygen or air may be used; magnesium oxide is created at normal temperature has a particularly low vapor pressure and is readily removed.

In accordance with the invention components may also be used which subject to the influence of the processing beam energy and/or processing temperature react with one another and are thus converted into substances which are gaseous in temperatures prevailing outside the processing region. Numerous substances of this kind are known; for example liquid or solid rocket fuels or explosives which on heating react either alone or with the supply of air or oxygen to form reaction products which are gaseous at normal temperature.

For the arrangement or supply of the auxiliary substance numerous possibilities exist. In accordance with the invention at least one auxiliary substance for example may be used which is distributed in the material to be processed and may be arranged stratified in the material to be processed. This possibility is particularly expedient when processing plastic materials. Another advantageous possibility exists in accordance with the invention in that a backing or support on at least one side of the workpiece contains the auxiliary substance or is comprised at least partly of the auxiliary substance. This backing may, for example be arranged on the side of the workpiece facing the beam source; it has been found that this method of operation is expedient particularly in high speed processing operations and/or when the material is not completely bored or cut through. In many cases it will be advantageous to arrange the backing on the side of the workpiece remote from the beam source. This mode of operation will of course be particularly suitable for processing operations in which the workpiece is completely bored and cut through and which after the workpiece has been completely penetrated allows auxiliary substance released from the support/backing and evaporated to flow through the processing passage just produced. With this mode of operation it is expedient for the backing to be thick enough so as not to be completely destroyed by the beam energy. The advantage of this embodiment is that the released and/or evaporated auxiliary substance can escape only through the processing passage produced in the workpiece.

A particularly expedient form of backing in accordance with the invention is characterized by the feature that the support is made of a porous material and that the auxiliary substance is contained in the pores of this material at normal temperature in a solid, liquid or gaseous state. The pores may be thus closed cells which are locally destroyed by the temperatures occurring at the processing point and/or by the beam energy after completely penetrating the workpiece, so that the auxiliary substance is released and/or evaporated. In many cases, however, it will simply be possible to use a porous material the pores of which are interconnected. Such porous materials may for example simply be saturated with liquid or molten auxiliary substance.

The process in accordance with the invention may be carried out with advantage so that as as a source for the auxiliary substance on the side of the workpiece remote from the beam source, at least in the processing region, a flow medium source is arranged, the pressure of which is higher than the gas pressure on the side of the workpiece facing the beam source, that a continuous processing passage is produced in the workpiece by the processing energy beam and that a stream of auxiliary substance is blown through the processing passage from the flow medium source. With this mode of operation a powdery, liquid or gaseous auxiliary substance may be introduced from a nozzle into the processing region. Particularly expedient in accordance with the invention is one embodiment which is characterized by the feature that a flow medium source on the side of the workpiece remote from the beam source a backing of permeable material is provided and that, in the space adjacent to the side of the support remote from the workpiece, the flow medium is kept in readiness. This embodiment has the advantage that the backing presents a certain flow resistance to the flow medium acting as auxiliary substance, so that the quantity of auxiliary substance entering the processing passage produced can be proportioned. Similarly in this embodiment a porous support may be used with advantage in which the pores are formed as screen cells distributed in predetermined arrangement for receiving the auxiliary substance. When the backing is to be permeable the screen cells may be continuous passages; in other embodiments in which no permeable support is required, it may sufficient however, for the screen cells to be formed as depressions or the like simply arranged in a certain manner. Screen cells which are formed as continuous passages may in accordance with the invention be characterized by the feature that each continuous passage is filled from the side which is remote from the beam source when the support is in use over the first part of its length with a suction or absorbent stopper adjoined by a second part extending to the other side and acting as collecting chamber for the auxiliary substance, whereby the suction stoppers comprise a material resistance to the action of the beam energy. This embodiment of a backing in accordance with the invention has the advantage that though the inflow of auxiliary substance is limited by the flow resistance of the porous absorbent stopper a reliably adequate immediately evaporable quantity of auxiliary substance for the momentary processing point is available due to the accumulation of auxiliary substance in the collecting chamber. The absorbent stopper is made of a material resistant to beam energy, for example a ceramics sintered material, so that such backings may be used repeatedly, in continuous processing operations.

In the case of permeable backings, especially those in which are formed as continuous screen passages, in accordance with the invention an absorbent layer may be arranged on the surface remote from the beam source when in use. This arrangement allows similar effects to be obtained as in the described use of an absorbent stopper. When the absorbent layer comprises a material resistant to the beam energy, for example of sintered ceramics or a sintered metal with a high melting point, such supports may also be used repeatedly and continuously.

When, on carrying out the process in accordance with the invention a processing energy beam is caused to act successively at several predetermined processing points of the workpiece, it may be expedient for the energy beam to be brought into action successively at processing points the distance between which is greater than the distance between two adjacent processing points. In this mode of operation, the energy beam after a processing operation does not leap to the adjacent point, but first to a more remote processing point, so that the point just processed can cool off before renewed processing occurring in the vicinity thereof. The application performance per unit surface area can be considerably increased in such a "leap control" of the energy beam for which there are numerous known technical process and apparatus.

As beam energy for the process in accordance with the invention, numerous different beam methods may be used, for example, a focused corpuscular beam of electro-mechanical energy, more particularly a light beam or laser beam. The use of such beams for processing purposes is known in the art, so that it is not necessary to describe the principles of such processes or the apparatus for carrying out these processes. A continuously operating apparatus for perforating strip or foil-like workpieces in accordance with the process of the invention is mentioned which is characterized by a rotatable drum, apparatus for feeding and discharging the workpiece to or from a part of the drum circumference, a beam source acting on of this part of the drum circumference and apparatus for charging the drum with auxiliary substance.

An alternative apparatus which may also be formed in the manner described and serving to carry out the mode of operation in which a permeable support is arranged on the side of the workpiece remote from the beam source, has a processing chamber containing the source of the beam energy and which is adjacent to the surface of the workpiece to be processed and adapted to be evacuated by means of a pump; in accordance with the invention this apparatus is characterized by the feature that at the workpiece the processing chamber is defined by side walls which are hermetically and displaceably adjacent and that the surface of the surface area of the workpiece defined by the side walls is so synchronized to the output of the pump and the gas pressure on the side of the support remote from the workpiece that the gas pressure in the processing chamber does not rise above a predetermined value. With such an apparatus types of beams may be used which more particularly can only be employed in a vacuum, for example electron beams.

In accordance with the invention apparatus for extracting material processing, especially for perforating workpieces by means of beam energy may be characterized by auxiliary devices for absorbing and/or removing the waste material accruing during processing.

The invention will be described further by way of example, with reference to the accompanying drawings, in which:

FIGS. 7,8,9 and 10 illustrate in similar view as in FIGS. 1 to 6, further embodiments of the process in accordance with the invention.

FIG. 11 is a process diagram for several points to be processed successively;

FIG. 12 illustrates by way of wholly schematic view, an apparatus for carrying out the process in accordance with the invention;

Figure 1:
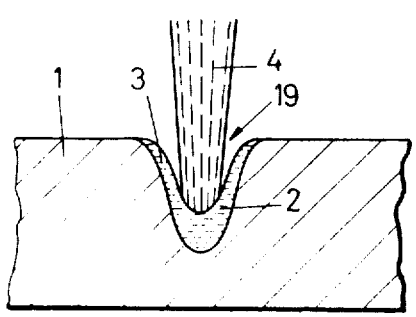
FIG. 1 is a schematic cross-section through a workpiece during processing by means of an energy beam.
Figure 2:
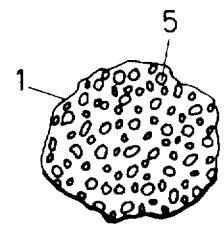
FIG. 2 is a schematic section through a material to be processed with the auxiliary substance distributed therein.
Figure 3:
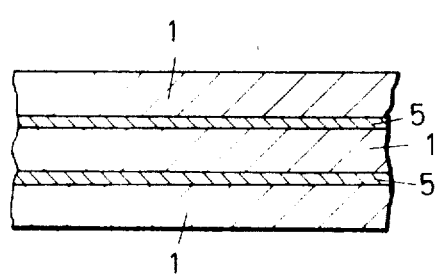
FIG. 3 is a cross-section through a workpiece which is composed of layers of material to be processed and auxiliary substance.

FIG. 1 shows in section a plate-shaped workpiece 1 during its processing by means of an energy beam 4 which may be, for example, an electron beam. Apparatus for producing, focusing and control of energy beams of all kinds are known in the art and are not described in detail herein. As shown in FIG. 1, the energy beam 4 serves to produce a depression 2, for example a groove or bore, and during processing in the processing region 19 on the internal surface of the recess 2, a funnel of molten material 3 of the workpiece is formed. To facilitate the removal of the molten material 3 from the processing region 19, an auxiliary substance is used which exerts pressure against the material impacted and heated by the beam energy which remove the workpiece material loosened by heating, and melting and/or evaporation from the processing region.

For the purpose of the process of the invention numerous substances may be used as auxiliary substances and those skilled in the art will not encounter any difficulties in finding suitable auxiliary substances which are suitable for the process of the invention and have more especially the properties as described above and hereinafter in detail.

Figure 4:
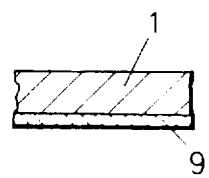
FIG. 4 is a schematic cross-section through a workpiece to be processed with a backing of auxiliary substance.
Figure 5:
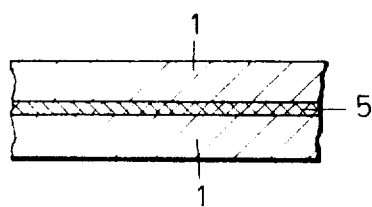
FIG. 5 is a schematic section through a workpiece to be processed having an inserted foil of auxiliary substance.

FIGS. 2 to 5 show possibilities of using the auxiliary substance. According to FIG. 2, the workpiece 1 to be processed contains the auxiliary substance in finely distributed form. According to FIG. 3 layers of auxiliary material are arranged between layers of workpiece material 1. According to FIG. 4 on one side of the workpiece 1 a backing 9 is used which is made partially or wholly of auxiliary substance or contains the auxiliary substance. According to FIG. 5 an intermediate layer of auxiliary substance 5, for example a foil made of the auxiliary substance, is used between two layers of workpiece material 1. Materials of the kind shown in FIGS. 3 to 5 may be readily produced by rolling cementing, soldering, riveting together and the like processes, as coherent workpieces. In auxiliary substances which normally are not available in the form of plates or foils, for example, in powdery auxiliary substances, the auxiliary substance layers 5 shown in FIGS. 3 to 5 may also be replaced by plates or foils of materials in which the auxiliary substance is contained. This applies also for the support 9 as shown in FIG. 4.

Figure 6:
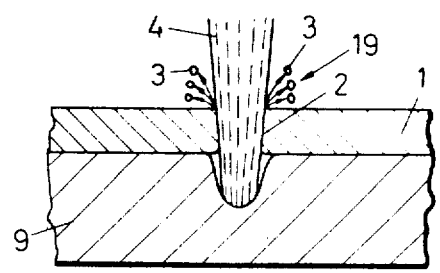
FIG. 6 illustrates schematically, by way of an analogous view to FIG. 1, a processing operation using a support of auxiliary substance located beneath the workpiece.

FIG. 6 illustrates a further alternative embodiment, or backing support in which a workpiece 1 is used with a backing 9 as shown in FIG. 4. An energy beam 4 is used as processing beam energy which arrives from a beam source (not shown) and produces a bore or a groove 2 in the workpiece 1. The support 9 is thus arranged on the side of the workpiece 1 remote from the beam source. It may also be expedient in certain instances, to arrange the support 9 on the opposite side, thus the side of the workpiece 1 facing the beam. FIG. 6 shows that the energy beam 4, after completely boring through the workpiece material 1, penetrates into the support 9 and thereby activating the auxiliary substance provided therein, i.e., developing a relatively large quantity of gas or vapor from the auxiliary substance. The latter then forcibly blows the workpiece material 3 melted by the energy beam 4 out of the processing region 19. The workpiece 1 may be made of steel and the support 9 of a readily evaporable metal, for example, zinc, magnesium or lead.

The following is a nonlimitative example of an embodiment of the process of the invention, in which an aluminum foil of 0.3 mm. thickness is to be perforated. On the side remote from the beam a backing support of 0.5 mm. thickness polytetrafluorethylene was provided and the aluminum foil was perforated with an electron beam. The beam voltage was 140 kv., the beam current 20 ma. and the action period per perforation hole 0.02 milliseconds. Closely tolerated and substantially cylindrical perforation holes having a diameter of 0.190 mm.±0.005 mm. resulted. With this process about 1,000 holes per second may be produced. This example is typical of the possibilities with the process of the invention and may allow also larger holes, the diameter of which being in the order of magnitude of the thickness of the workpiece or even larger, to be produced at a high speed and with a high degree of accuracy with a single beam impulse per hole.

FIG. 7 shows a plate-shaped workpiece 1 with perforations 2 which were produced with an energy beam. On the side remote from the beam there is a support of porous material 10. The auxiliary substance is contained in the pores of this porous material in solid, liquid or gaseous form at normal temperature. When the porous support material 10 is so fashioned it is not destroyed by the processing energy beam; the pores 11 must not of course be closed. An example of such a case is a support made of sintered ceramics or sintered metal which is saturated with a liquid or molten auxiliary substance. Often, however, a porous material can be used which is destroyed by the processing energy beam. This case is shown in FIG. 7. It does not matter whether the pores 11 are open or closed. Closed pores will be used predominantly in gaseous auxiliary substances; an example for this is polyurethane foam formed with oxygen. In the example shown in FIG. 7 the support of porous mass 10 was selected to be so thick as to prevent it from being completely destroyed by the processing energy beam but only in the regions 18 adjacent to the workpiece. This behavior may be obtained when the material is used for the support 9 which has a relatively low absorbability for the type of beam used. It is seen that the gas or vapor quantities produced in the region 18 can escape only through the processing region 18. The size of pores and the thickness of the support 9 depend also upon how much gas or steam vapor is desired to be developed at the processing point. Liquid or solid auxiliary substances are of particular advantage herein, since they can develop a large quantity of gas or vapor from a small volume.

FIG. 8 is similar to FIG. 7 but a backing 9 has been used which has relatively large, closed pores 11 elongated in the beam direction.

In FIG. 9 an alternative embodiment of the process of the invention is illustrated. A workpiece 1 is provided with continuous bores 2 by means of an energy beam 4. On the side of the workpiece 1, remote from the beam, a pipe 7 is connected which continues in a connecting pipe 8. The point 14 is supported against the workpiece 1 at which the free end of the pipe 7 may be provided with suitable sealing means, for example a sliding packing, so that the pipe 7 may be moved relative to the workpiece 1. An auxiliary substance in the form of a flow medium is introduced via the connecting pipe 8 so that each completed perforation 2 is traversed by a stream of auxiliary substance. The cross-sectional area of the pipe 7 may also be made as small as possible to keep the quantity of auxiliary substance flowing through the bore 2 as small as possible and may, for example, be small enough so as to enclose only a single perforation 2 at a time. To limit the flow medium stream through the completed bores 2, a support 10 of permeable material may be placed between the flow medium source and the workpiece, which has a certain flow resistance. This is of particular advantage when the processing energy beam 4 extends in a chamber which is subject to reduced pressure.

FIG. 10 also shows a workpiece 1 with a support 9. The pores of this support are formed by continuous passages 11 and in the space 23 which is adjacent to the side of the support 9 remote from the workpiece, an auxiliary substance in the form of gas or liquid (not shown) is provided. As shown in FIGS. 7 and 8 the perforations 2 have been formed in the workpiece 1 by means of an energy beam and at 18 a region of the support 9 destroyed by the beam is indicated. It is also possible in all embodiments in which the support 9 is permeable as a whole (e.g., in FIGS. 9 and 10), to make the support 9 of a material resistant to beam energy, for example of ceramics, high-melting metal, glass wool and the like.

In may circumstances, it may be expedient to arrange the auxiliary substance or a substance containing the auxiliary substance at certain processing points of the workpiece or a support of the workpiece. FIG. 11 illustrates schematically such a screen-like arrangement of processing points 19 on the workpiece 1. In such processings, especially when producing finely perforated plates or foils, it is of importance that the numerous juxtaposed processing points do not cause any inadmissibly high heating of the workpiece during processing. FIG. 11 shows how such overheatings can be avoided or at least reduced by suitably controlling the energy beam. When the processing points 19 are processed substantially in sequence, as indicated by small numbers at the side of the individual processing points, each individual processing point has several impulse intervals for cooling-off before processing is carried out again in their immediate vicinity. There are any number of types of such intermittent control of the processing energy beam.

An apparatus for carrying out the process of the invention is shown schematically in FIG. 12. The apparatus has a treatment chamber 12 containing the beam source 15 and adapted to be evacuated via a socket 16 by means of a pump (not shown). The beam source 15 may be an electron beam generating system. The apparatus for focusing and deflecting the energy beam 4 are not shown; such apparatus are known in the art. The treatment chamber 12 is defined by side walls 13, the free edges 14 of which being formed as sliding packings and being hermetically supported against one side of the workpiece 1 to be processed. The side walls of the treatment chamber define only a relatively small surface region of the workpiece 1. In FIG. 12 the perforating of the workpiece 1 with perforating holes 2 is explained. On the side of the workpiece 1 remote from the beam source 15 a support of porous mass is provided. In the pores of this mass the auxiliary substance is contained or in the manner of FIG. 9 on the side of the porous mass 10 remote from the workpiece 1 a flow medium acting as auxiliary substance kept in readiness. It is possible, for the atmospheric air simply to act as auxiliary substance. It is seen that the flow of auxiliary substance or its reaction products from the porous mass 10 entering the processing chamber 12 via the completed perforation bores 2, depends upon the number of perforations 2 located in the lower cross-section of the treatment chamber 12 and upon the flow resistance of the porous mass 10. Hence, there is a certain connection between the output of the pump (not shown) connected to the socket 16 and the gas pressure maintained in the treatment chamber 12, and with suitable dimensioning of the lower constricted section of the treatment chamber 12 or the suitable selection of the porous mass it is possible with a given pump output to ensure that the pressure in the treatment chamber 12 does not rise above a predetermined value. During processing, the apparatus is moved relative to the workpiece 1. It is also possible for the support or porous mass 10 to be moved together with the treatment apparatus relative to the workpiece 1, so that an appropriately small support suffices. The latter will, however, have to be so fashioned that it is resistance to the action of the energy beam 4.

Figure 13:
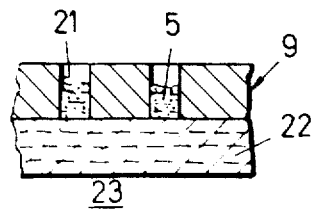
FIG. 13 is a schematic cross-section through a backing in accordance with the invention for a workpiece to be processed.

FIG. 13 shows a support 9 which corresponds substantially to the support of FIG. 10. In this case, however, an absorbent layer 22 is arranged on one side of the support 9 and contains the auxiliary substance or serves to supply the auxiliary substance (similar to the porous layer 10 in the apparatus shown in FIG. 12). FIG. 13 illustrates that, when using a liquid auxiliary substance, a certain reserve of auxiliary substance will accumulate in every continuous passage of the support 9. The advantage of this is that, despite a relatively high flow resistance of the porous mass 22, a relatively large reserve of auxiliary substance 5 is available in every continuous passage of the support 9.

Figure 14:
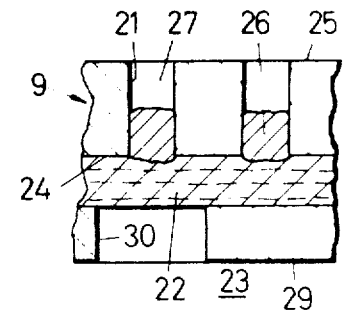
FIG. 14 is a similar view as FIG. 13 and showing alternative embodiment of a backing with carrier plate.

A similar arrangement is shown in FIG. 14. Each continuous passage of the support 9 from the side 24, which when the support is in use (not shown) is remote from the beam source, is filled for part of its length with an absorbent stopper 26. The second part 27 of the continuous passage, which remains open, acts as collecting chamber for the auxiliary substance which may be supplied in this case in a liquid or gaseous state directly from the side 24 of the support 9. In FIG. 14, however, an additional absorbent layer 22 as in FIG. 13 is provided and beneath this is located a carrier plate 29 with continuous openings 30. The carrier plate 29 adjoins the chamber 23 in which a flow medium acting as auxiliary substance is contained. As in the embodiment of FIG. 13, when using a liquid auxiliary substance a uniform distribution is effected via the opening 30, the absorbent layer 22 and the suction stoppers 26, so that via each suction stopper a small reserve (not shown) of liquid auxiliary substance will finally accumulate in the same manner.

The supports as shown in FIGS. 13 and 14 are particularly suitable for repeated use since they are made of a material resistant to beam energy. Particularly expedient are such supports also in the event of plate- or foil-shaped materials which are to be perforated with a predetermined screen pattern. In this case a support 9 may be arranged on the side remote from the beam source which contains the auxiliary substance in the pores which are distributed in exactly the same way as the screen pattern to be produced in the workpiece. The pores themselves then form screen cells 21. If it is ensured that the processing energy beam is caused to act exactly at points of the workpiece which are aligned in the direction of beam against the screen cells, then the advantage is obtained in that each individual perforation bore is produced accurately over a screen cell filled with auxiliary substance. Thus, there is an accurately predetermined quantity of auxiliary substance available for each perforation bore.

Figure 15:
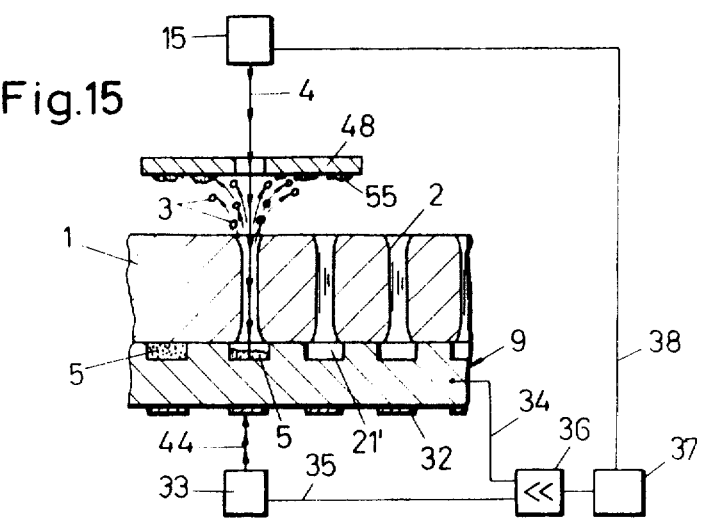
FIG. 15 illustrates a process using a backing in which the auxiliary substance has been distributed in the manner of a screen.

FIG. 15 shows an apparatus for producing such perforations in predetermined screen patterns. The workpiece 1 to be perforated, shown in section, is moved relative to the processing energy beam and the latter is caused to act impulse-like; each impulse producing one perforation bore. On the side of the workpiece 1 remote from the beam source 15, a support 9 is provided which in the surface facing the workpiece 1 has screen cells 21 in the form of depressions. The state before processing is shown in the left-hand part of FIG. 15. As soon as a position has been assumed in which the beam direction points accurately at a screen cell 21 during the relative movement between beam 4 and workpiece 1, the beam 4 is caused to be brought into operation and a perforation produced. As shown in FIG. 15, after completely penetrating the workpiece 1, the auxiliary substance 5 contained in the screen cell concerned is evaporated so that it escapes upwardly from the perforation passage 2 produced and forcibly engages molten workpiece material 3. The waste material ejected in this manner from the upper end of each perforation passage produced in the apparatus shown in FIG. 15 is collected by an auxiliary device, which in the simplest case comprises a diaphragm 48 moved with the beam 4 relative to the workpiece. The waste material 55 collected on the diaphragm 48 is removed after a certain operating period. It is also possible to use other devices for trapping and/or removing the waste material accruing during processing.

The apparatus according to FIG. 15 furthermore includes devices which automatically ensure that the processing energy beam is switched on accurately over a screen cell. For this purpose, markings 32 are provided on the side of the support 9 remote from the workpiece which each indicate a screen cell 21 located thereover. The markings 32 are scanned with a feeler 44 which is aligned accurately with the processing energy beam 4. When during a relative movement of the workpiece 1 to the energy beam 4, the feeler 44 scans a marking 32 then, via a lead 35, a signal is given to an amplifier 36. The output of the amplifier 36 controls a beam control device 37 which then, via the lead 38, switches on the beam source 15. In FIG. 15 an energy beam is shown acting also as feeler 44 which arrives from an auxiliary beam source 33. When, e.g., the auxiliary beam source 33 produces an electron beam 44 as feeler, the support 9 may be made of electrically conductive material and be connected to the input of the amplifier 36 via a lead 34. The markings 32 may be small insulating members so that each time the auxiliary electron beam 44 strikes against such a marking 32, the circuit leading to the amplifier 36 is broken and thereby the actual beam source 15 switched on. Other feeler devices may be used, for example, mechanical, magnetic or optical feelers.

Figure 16:
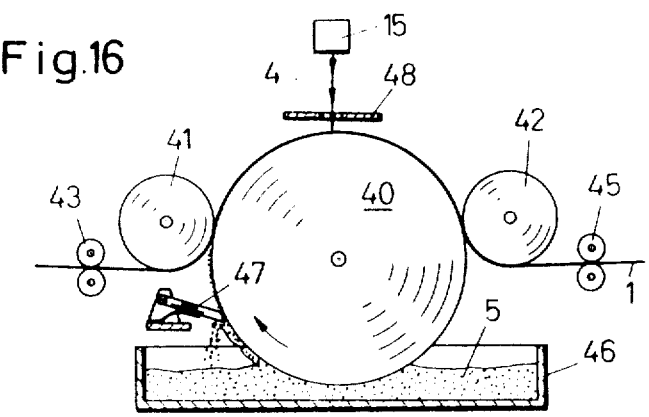
FIG. 16 illustrates in a wholly schematic view an alternative apparatus for carrying out the process of the invention.

FIG. 16 illustrates schematically an apparatus for the continuous perforation of strip- or foil-like workpieces 1. The apparatus contains a rotatable drum 40 and the strip to be processed is conducted by means of roller conveyors 43, 45 and guide rollers 41, 42 over a part of the circumference of the drum 40. Above this part of the drum circumference a beam source 15 is arranged which produces energy beam impulses 4 to perforate the workpiece 1. The drum passes through an auxiliary substance container 46 with another part of its circumference so that the drum surface is charged with the auxiliary substance 5 contained therein. To remove surplus auxiliary substance a doctor blade 47 may be provided and urged resiliently against the drum 40. The direction of rotation of the drum is indicated by an arrow. In the use of an auxiliary substance container 46 as shown, the surface of the drum 40 is of course sealed and preferably contains screen cells of the type of the screen cells 21 shown in FIG. 15. It is however also possible for the drum surface to be fashioned in the manner of the supports shown in FIGS. 13 and 14 and to supply the auxiliary substance in a liquid or gaseous state from the interior of the drum. Beam 4 devices may be used to control the processing energy which in turn switch on the energy beam 4 accurately when a screen cell is located below the energy beam. Such a device may simply comprise a fixed coupling between the rotation of the drum 40 and the control of the beam source 15; in this case scanning devices in the manner of feelers or an auxiliary beam 44 of FIG. 15 are not required.

I claim:

1. A process for removing material from workpieces by means of beamed radiant energy to produce depressions, slots, cuts and bores, comprising the steps of assembling with said workpiece on one side thereof a carrier body comprising a porous material having an auxiliary substance contained in the pores thereof, and impacting and heating portions of the workpiece material which are to be removed by applying beamed radiant energy thereto until those portions change their state of aggregation, said beamed radiant energy being effective on the portions of said carrier body and the auxiliary substance contained therein immediately adjacent the portions of the workpiece which have been impacted and heated to thereby develop high velocity gas which exerts forces on said impacted and heated portions tending to remove them from the workpiece.

2. The process of claim 1 in which the auxiliary substance is selected to be vaporized by the beamed radiant energy applied thereto, so that the vapor pressure which is generated during the processing blows the impacted and heated portions of the material to be removed out of the processing region.

3. The process of claim 1, in which a metal is used as auxiliary substance which develops a vapor pressure which is higher than the vapor pressure developed by the material of the workpiece at temperatures developed by the application of beamed radiant energy thereof.

4. The process of claim 1, including the step of selecting the auxiliary substance to react, under the conditions caused by said beamed radiant energy during the processing, substantially completely into products which are gaseous at the temperatures existing outside of the processing area.

5. The process of claim 4, wherein said auxiliary substance comprises halogenated polyethylene.

6. The process of claim 1 in which the auxiliary substance contains at least one component which reacts chemically to the application of said beamed radiant energy thereto to from at least one reaction product which, at temperatures existing outside of the processing area of the workpiece, has a vapor pressure which is lower than the pressure which would exist outside the processing area in the absence of the reaction product.

7. The process of claim 1, including the step of selecting the auxiliary substance to contain at least two components which react chemically with one another under the conditions caused by said beamed radiant energy during the processing in said processing area to reaction products which are gaseous at temperatures existing outside of the processing area.

8. The process of claim 1, wherein the auxiliary substance is distributed in the material to be processed, for example, stratified in the material to be processed.

9. The process of claim 1, wherein the material-removing processing completely penetrates the workpiece, including the step of providing the auxiliary substance in fluid form at the side of the workpiece opposite to the side of incidence of the beamed radiant energy, the pressure of the fluid auxiliary substance being higher than the pressure existing on the other side of the workpiece.

10. The process of claim 9, including the step of providing a layer of a permeable material on the side of the workpiece opposite to the side of incidence of the beamed radiant energy, the permeability and the thickness of the permeable material being selected to offer a desired flow resistance to the stream of the fluid auxiliary substance traversing the workpiece at points or areas thereof which have been completely penetrated.

11. The process of claim 1, wherein the material-removing processing completely penetrates the workpiece, including the steps of arranging the carrier body on the side of the workpiece opposite to the side of incidence of the beamed radiant energy, and selecting the thickness of the carrier body so that the processing beamed radiant energy is not capable of completely penetrating the carrier body.

12. The process of claim 1, in which said carrier body comprises a porous material, the said auxiliary substance being contained in the pores of this material in solid, liquid or gaseous form at normal temperature.

13. The process of claim 1, wherein a carrier body is used, the pores of which are closed cells and in which said cells are destroyed locally by the impact of beamed radiant energy applied thereto after having penetrated said workpiece.

14. The process of claim 1, wherein a carrier body is used, the pores of which are arranged in a predetermined pattern, the process including bringing the processing beamed radiant energy into action at points of the workpiece which are aligned in the beam direction towards said cells.

15. The process of claim 1, and further including bringing said processing beamed radiant energy into action successively at a plurality of predetermined processing points of said workpiece, the distance between subsequently processed processing points being larger than the distance between adjacent processing points.

16. The process of claim 1, in which as beamed radiant energy a focused corpuscular beam, particularly an electron beam, is used.

17. The process of claim 1, in which as beamed radiant energy a focused beam of electromagnetic energy, particularly a laser beam, is used.

* * * * *